May 1, 1956 B. SOLOW 2,743,506
METHOD OF MANUFACTURING RECTIFIER CELLS
Filed Feb. 23, 1952 3 Sheets-Sheet 1
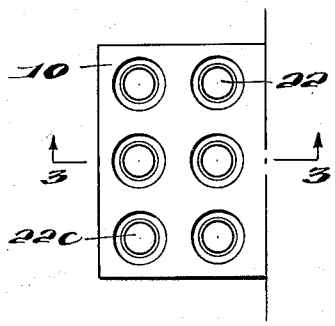
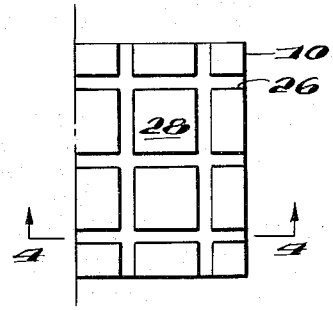
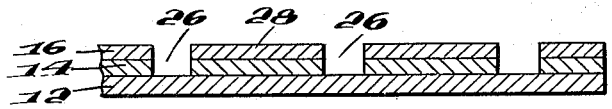
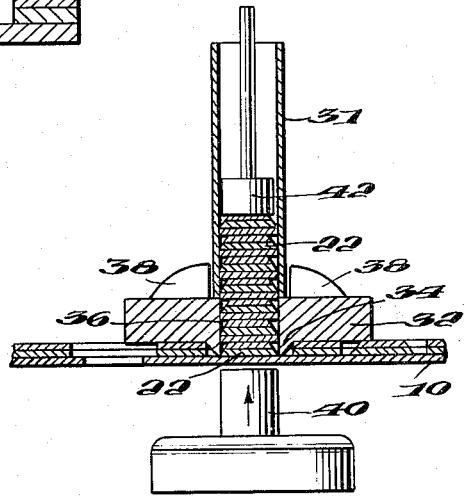
INVENTOR
BENJAMIN SOLOW,
BY Albert M Zalkind
ATTORNEY

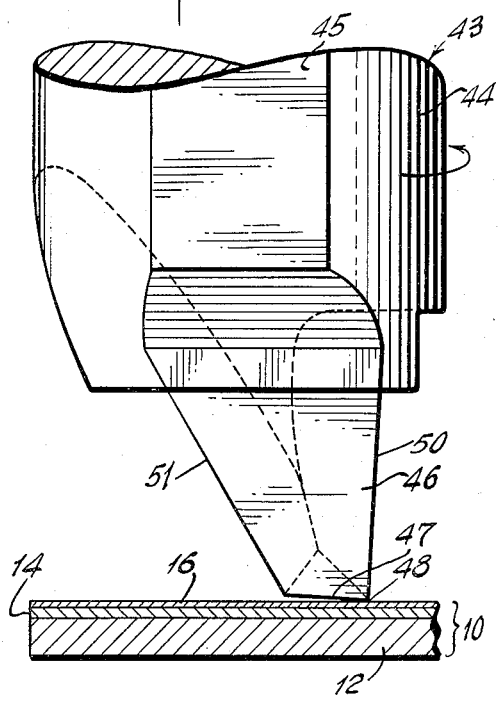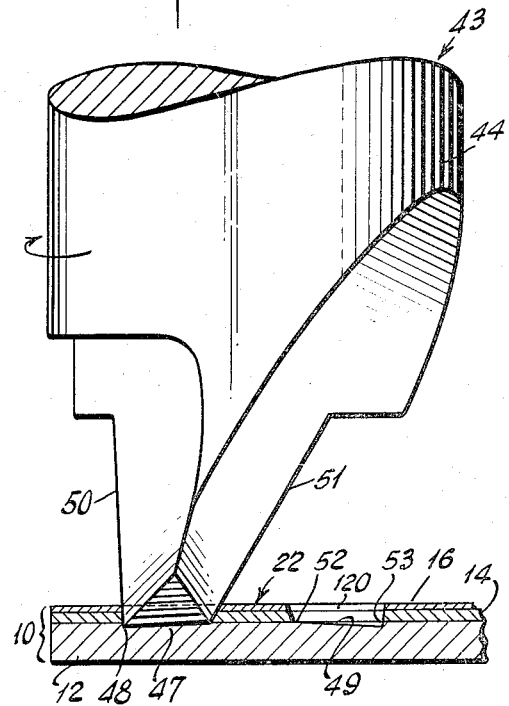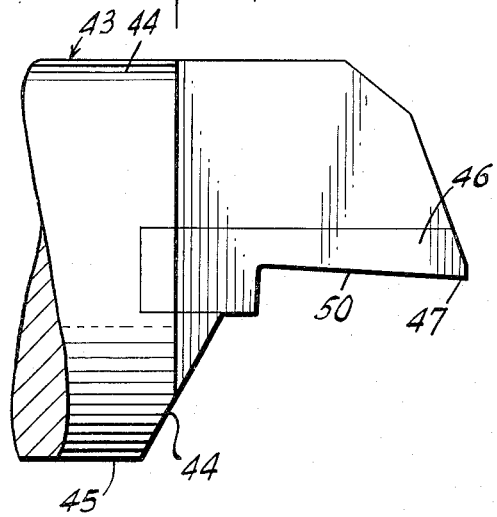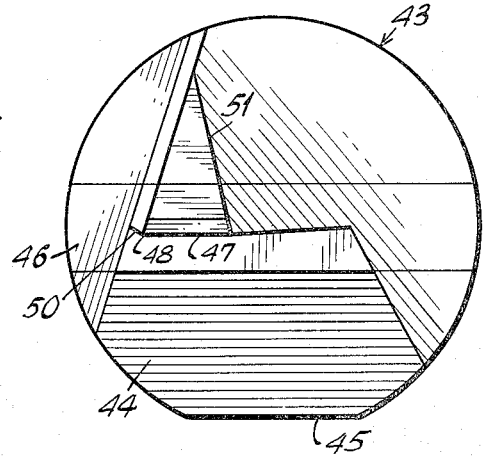

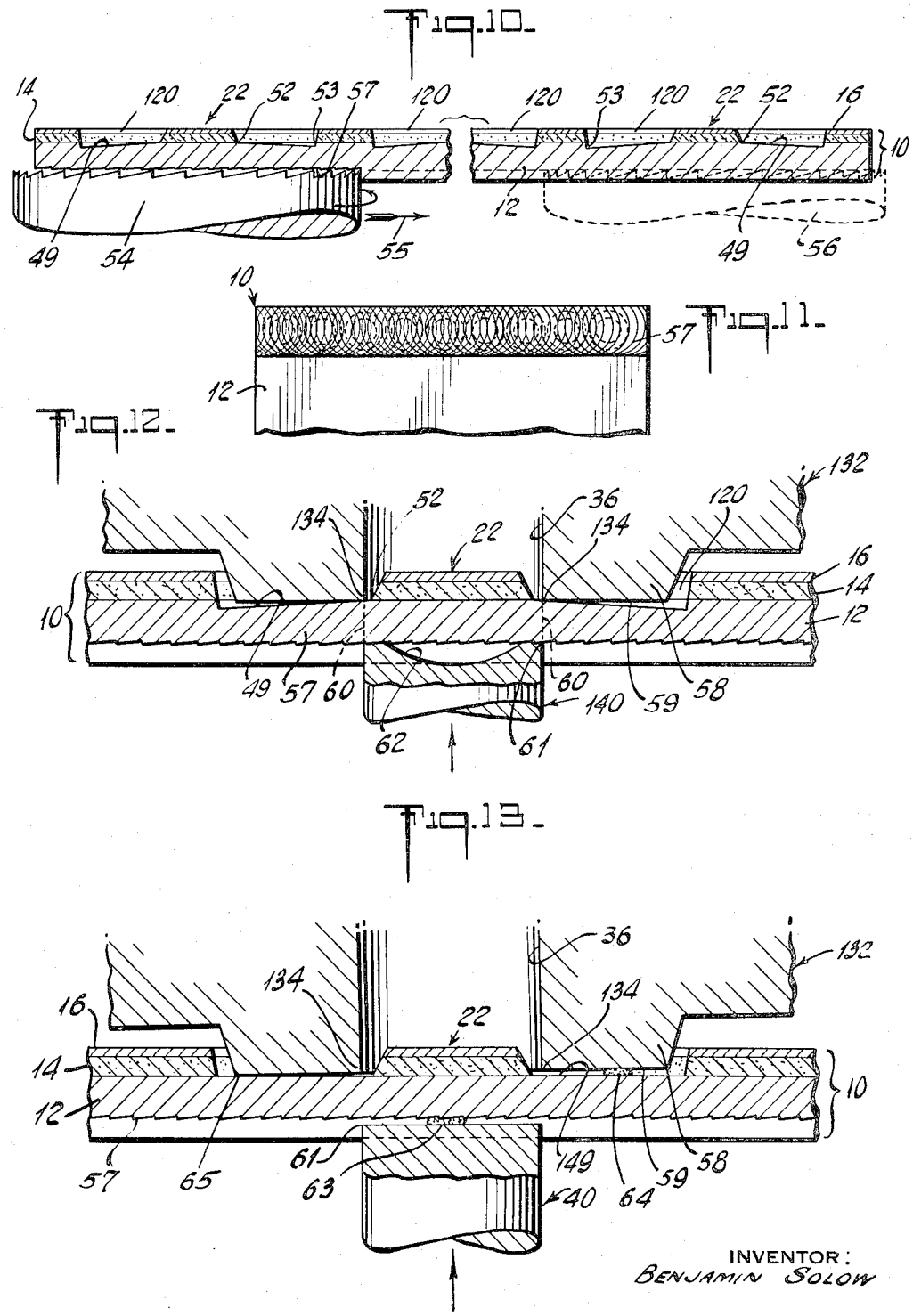

United States Patent Office 2,743,506
Patented May 1, 1956

2,743,506
METHOD OF MANUFACTURING RECTIFIER CELLS

Benjamin Solow, Philadelphia, Pa., assignor to International Resistance Company, Philadelphia, Pa., a corporation of Delaware Application February 23, 1952, Serial No. 273,030

7 Claims. (Cl. 29—155.5)

This invention relates to methods of and machines for manufacturing rectifier cells and more particularly to a method and machine for making a plurality of cells from a laminated sheet.

It is known in the prior art that rectifier cells, for example, selenium-type cells, may be made by forming a layer of selenium on a metal base and subsequently forming a layer of Wood's metal over the layer of selenium, thus effecting a laminated sheet. This sheet may then be cut up into small pieces each of which is an individual rectifier cell. For example, U. S. Patent No. 2,296,575 discloses a method of stamping a plurality of cells from a laminated sheet, the individual cells being subsequently beveled about their peripheries to eliminate short circuiting burrs which occur as the result of the stamping operation.

My invention represents an improvement over the method just described, which prior method, while feasible for the manufacture of individual cells of fairly large size, becomes impractical where the cells are of the order of a fraction of an inch in diameter, due to the difficulty of handling such small elements. Further, the prior art method is inherently slow and requires individual manipulation of each cell primarily in machining and also in assembling a plurality of cells to form a rectifier bank.

Accordingly, it is an object of my invention to provide a method of and machine for manufacturing rectifier cells from laminated sheets in such a manner that individual handling of cells for machining operations is eliminated. It is a further object of my invention to provide a method of manufacturing rectifier cells such that a succession of cells formed from a laminated sheet may be fed directly into a tube forming the container of a rectifier bank without any intermediate handling.

Briefly, my novel method comprises milling with suitable cutters, a plurality of grooved formations in a laminated selenium sheet, such milling passing through the Wood's metal and selenium layers, but not through the base layer although the grooves may go partially into the base layer. The word "milling" is intended to mean any type of cutting whereby these layers are cleanly severed without fracture or damage and without leaving any burrs overhanging or bridging the layers. This milling operation thus divides the sheet into a plurality of individual rectifier cells held together by the uncut thickness of the base layer. Subsequently, each cell is separated from the sheet by a punching operation using a punch having a configuration of the cell and being centered with respect thereto so as to successively punch each cell from the sheet.

An important effect of delineating each cell by milling through the top layers of the sheet prior to punching is found to reside in the elimination of shattering during the punching operation; thus, since a substantial reduction in thickness of the laminated sheet is effected, around each cell area, the punching force required is correspondingly reduced and the shock effect on the sheet greatly diminished. This is significant in view of the brittleness of the selenium layer. A further advantage of initially milling the cells while in situ is the elimination of burrs in the selenium and Wood's metal layers which would otherwise occur during a punching operation. In fact, the prior art patent referred to hereinabove requires machining subsequent to punching for the removal of burrs.

In rectifier cells of the indicated type the valving layer or lamina of valving metallic composition frequently is crystalline in structure and quite brittle, as is particularly true in selenium cells. Such valving layer is pressure sensitive and will resist only limited stresses. In producing such cells, bending the laminated stock or otherwise subjecting the valving layer to higher stress will increase its forward resistance and may likely separate the laminae, as well as damage the valving layer for an indefinite distance from the edges of the cells being made. The valving layer is highly susceptible to cracking under undue stress, such as that attendant on bending, and the development of even minute cracks of microscopic dimension seriously alters the electrical characteristics of such cells. As a result, a high percentage discard of the output from heretofore common production methods has been expensively characteristic thereof. It is thus highly important and a salient object of the present invention to minimize tendencies to bend and mechanically deform the laminated stock during cell production. Since deep precision milling for producing very small cells (which may be of the order of $1/16''$ in diameter) is quite difficult, an embodiment of the present method suitable for commercial practice in mass producing such cells may be characterized by shallower milling through the valving lamina to define localized islands, preferably in association with back milling to thin down the base lamina, and punching the latter about the boundaries of the islands in such manner as to assure limitation of initial die and punch contact with base stock and concentration of punching stress to the intended circular line of cut.

A more detailed description of my invention will now be given in conjunction with the accompanying drawings in which:

Fig. 1 is a plan view showing a laminated sheet milled with circular grooves;

Fig. 2 is a plan view of a laminated sheet showing grooves milled therein and intersecting at right angles with each other so as to effect a series of isolated formations;

Fig. 3 is an enlarged section taken through 3—3 of Fig. 1;

Fig. 4 is an enlarged section taken through 4—4 of Fig. 2;

Fig. 5 illustrates a mode of punching the cells successively from a milled sheet and simultaneously assembling the cells into a tubular container forming a holder thereof in a rectifier bank;

Fig. 6 is an enlarged elevational view to a scale of about 6:1, with parts broken away and in section, showing the beginning of the milling of a sheet of laminated stock as an initial step of a commercially practical embodiment of the method of the present invention, and employing an offset or eccentric circle cutter of special design, a portion of which is shown in front elevation;

Fig. 7 is a view similar to Fig. 6 but with the back of the cutter shown from a point of view 180° to that of Fig. 6 and in a position of substantial completion of the initial step of milling;

Fig. 8 is an end view and Fig. 9 is a side view, with parts broken away, of the cutter shown in Figs. 6 and 7;

Fig. 10 is an enlarged sectional view, with parts broken away, taken medially through a row of the cell grooves illustrated in Fig. 7 along one edge of the sheet of laminated stock, showing as the next step in the method back milling of the base lamina such as by a rotary milling tool shown in elevation with part broken away;

Fig. 11 is a back view substantially to scale of a portion of the sheet of laminated stock after completion of the milling step illustrated in Fig. 10;

Fig. 12 is an elevational section to a still greater scale of the stock shown in Fig. 11, with parts broken away, taken medially through the portion milled for one cell, and illustrating initial contact of the base lamina by opposed die and punch structure used in a modified form of the final punching operation shown in Fig. 5; and Fig. 13 is a view similar to Fig. 12 illustrating graphically troubles that may develop in and problems attendant upon a punching operation which lacks features illustrated in Fig. 12, pointing up the importance of certain characteristics of the procedure illustrated in Figs. 6 to 12, incl., one of the differences being the omission in the Fig. 13 set-up of the important tapered or sloped surface of the bottom of the groove characterizing the Fig. 7 milling and graphically shown therein and in Figs. 10 and 12.

Referring to Figs. 1 and 3 the method of my invention is illustrated in the milling of a laminated sheet 10 comprising base metal, selenium, and Wood's metal layers 12, 14 and 16 respectively. In this instance a plurality of circular grooves 20 is formed with a rotary hollow milling cutter (not shown) preferably having an internal bevel so as to produce sloping sides for the Wood's metal and selenium layers of the prospective cells 22. This bevelling serves to elongate the leakage path between the metallic layers 12 and 16; thereby making for a better final product although it will be appreciated that a flat end rotary tool could be utilized. The cell elements 22 may be punched from the sheet 10 along the indicated dotted lines in the manner shown in Fig. 6 to be hereinafter described.

Referring to Figs. 2 and 4, it will be apparent that my method comprises the provision of a series of spaced intersecting grooves 26 passing through the Wood's metal and selenium layers and thus subdividing sheet 10 into a plurality of square cells 28. Any suitable milling cutters may be utilized for this purpose and subsequent to the milling operation individual cells may be punched from the sheet through planes passing centrally through the grooves, such planes being indicated by dot-dash lines in Figs. 2 and 4. Alternatively, the punching operation may be devised so that the three layers are of the same diameters; that is, the base layer of each cell will not be oversize as provided for by punching through the central planes indicated. In any event, it will be apparent that the initial milling operation renders individual deburring of separate rectifier cells unnecessary since the punch action is on the base layer only, and normally takes place upwardly therethrough so that any burr formed from the base layer is inclined in a direction away from the selenium and Wood's metal layers.

Referring to Fig. 5, there is disclosed therein the fundamental elements of a punching operation for removing the rectifier cells, for example cells 22 of Fig. 1, and introducing them directly into a tubular container 31 which will hold them permanently in a rectifier bank. Thus the sheet 10 is fed below a female die 32 having centering lips 34 which properly orient each cell with respect to the axis of the die hole 36 and tube 31, the latter being centered in guide ribs 38. In this instance the punch 40 moves upwardly to punch each cell in turn through the female die and into tube 31. A downwardly biased ram 42 is utilized to maintain the plurality of cells in parallelism. Ram 42 may be either spring or weight biased and when a sufficient number of cells are in tube 31 the ram is removed and tube 31 is then provided with conventional contact members at each end to complete the rectifier bank.

In the manner hereinabove disclosed cells of the order of $\frac{1}{16}''$ diameter may be obtained in an efficient and economical manner due to elimination of individual handling during the machining steps, and this is independent of the direct assembly procedure disclosed in Fig. 5.

Thus it will be apparent that my novel method is capable of rapid and economical operation and further, may be set up for use with a minimum of investment for special parts and machines. For example, the operations disclosed in Figs. 1 and 3, require no more than a drill press and a standard circle milling cutter. On the other hand, the operation described in conjunction with Figs. 2 and 4 can be performed on a standard milling machine using a standard milling cutter. Further, the punch and die elements fundamentally disclosed in Fig. 5 are extremely simple and cheap to obtain, particularly since they need not be of very rugged character if the milling step is carried to a point where the base layer 12 is partially cut through so as to substantially reduce the cross-section of metal acted on by the punch.

The method of the present invention is readily adapted to a rectifier cell production procedure characterized by features which minimize tendencies to bend and deleteriously stress the sheet stock during a punching operation. This is important as previously pointed out since high stress in areas of the base lamina overlaid by the valving lamina, such as may result from undue bending during punching, tends to separate the laminae and to crack the brittle valving cell layer from its edges inward. The procedure of Fig. 5 is well designed to minimize and substantially eliminate such tendencies. That obtains since the initial contact between the female die 32 and the work or the ribbon of the material of the base layer 12 exposed at the bottom of the groove 20 is localized to circular line contact at the edge of circular tapered lip 34, which cutting edge is concentric to the circular edge of punch 40. The outer diameter of the circular edge of punch 40 of course is slightly smaller than the die bore 36 and circular lip 34 to permit telescope of the former into the latter but they are substantially aligned there to concentrate the punching stresses.

In Figs. 6 to 12, incl., there is illustrated another embodiment of the method of the present invention which is admirably suited to minimizing such tendencies of destructive bending and damaging stress during punching. This procedure has proven in commercial production to be simple, economical, practical and efficient for mass producing rectifier cells of the selenium type and more particularly those of unusually small dimensions, such as, for example, as small as $\frac{1}{16}''$ in diameter. By the practice of such invention one may now produce such miniature selenium rectifier cells superior to any commercial selenium rectifier cells made by any other method.

As illustrated in Fig. 6, the first step of such preferred embodiment of the method of the present invention may comprise arranging a stock sheet 10 below an offset or eccentric circle cutter 43 of unique design and then milling a circular groove successively down through the counter-electrode layer or lamina of Wood's metal 16 and the medial layer or lamina of selenium 14, to define an island or button 22 as illustrated in Fig. 7. As will be seen from Figs. 6, 7, 8 and 9, the cutter 43 preferably comprises a cylindrical steel shank 44 flatted off on one side (the face) at 45 and tipped with a hard metal carbide insert 46. The tip of the tool 43 is suitably machined or ground to provide an offset or eccentric single lip 47 of a width sufficient to cut a circular groove and obliqued or sloped with respect to a plane normal to the tool axis downwardly to its outer edge 48 at an angle of a few degrees, such as about 2°, this for the very important purpose of cutting the bottom of the groove 120 on a sloping angle deepest at the outside margin thereof, i. e., a frusto-conical bottom surface 49, as illustrated in Fig. 7, the importance of which will be emphasized hereinafter. The outside edge 50 of the tool bit slopes outwardly or away from the axis of the tool; this is a small angle of a few degrees, preferably about 2°. The inside edge 51 thereof (Fig. 7) slopes away from the tool axis more obliquely to form an angle of about 60° to a horizontal plane normal to the tool axis. This results in sloped or diverging sides for the milled groove 120, as will best be seen in Fig. 7. The tool tip is also machined or ground to provide adequate top rake, side reliefs or rakes, and bottom clearance as shown.

After the circular groove 120 has been milled successively down through the counter-electrode lamina 16 and the selenium lamina 14 to expose a ribbon or band of the base lamina 12, this milling is preferably discontinued when the highest inside margin 52 thereof is located just below the interface between the selenium and base laminae or layers, and, as a consequence, the outside margin 53 is located appreciably below such interface to provide the outwardly sloping or frusto-conical groove bottom surface 49. Such milling of circular groove 120 is then repeated along the edge of the sheet of laminated stock so as to form a row of successively arranged cell islands or buttons 22—22, as indicated in Fig. 10.

It is preferable to have the base lamina or layer 12 of aluminum or the like of appreciable thickness so as to facilitate such milling step preceding the punching with minimized tendency to warp or bend the laminated stock. After such milling, the back of the excessively thick base layer 12 is then, as a second step in the procedure, suitably milled to reduce the thickness thereof, thus facilitating the punching.

This second milling step may be practiced with a rotary miller 54 traversed along the edge of the back of the base layer 12 in the direction of the arrow 55, as shown in Fig. 10, to the dotted line position 56 therein indicated so as to rabbet the edge of the laminated sheet at 57 behind the row of cell buttons 22—22, as is best seen in Fig. 11. Such milling may be somewhat rough, as indicated in Fig. 11 wherein arcuate milling lines in rabbet 57 are illustrated, a smooth surface being unnecessary. It is preferred to limit such back milling to the zone over which the row of cell buttons 22—22 is located so as to maintain the strength and rigidity in the remainder of the stock sheet, successive linear zones of which are to be processed thereafter in a like manner.

The next step in the procedure illustrated in Figs. 6 to 12, incl., is shown in Fig. 12 and comprises a variation of the punching operation illustrated in Fig. 5. For such purpose, female die 132 may have an end button 58 provided with a flat surface 59 to define with bore 36 a circular cutting edge 134 of certain internal diameter. One of the cell buttons 22 is received in the female die bore 36 and contact between the die and base layer is limited to line contact between the circular cutting edge 134 and the sloped or frusto-conical bottom surface 49 of the annular groove 120. Furthermore the inner diameter of edge 134 is preferably larger than the base diameter of the button 22 as seen in Fig. 12 so that the cutting edge and other die structure are spaced from the button during the punching operation to be described.

Punching may now take place. Punch 140 moves upwardly to contact the bottom face of base layer 12 in the rabbet 57 with its circumferential edge 61 of an outer diameter only slightly less than the internal diameter of the circular die edge 134. Movement of punch 140 toward die 132 severs a disc from the base layer substantially along a cylindrical plane indicated by dotted lines 60 in Fig. 12 with the cutting stress substantially concentrated along that cylindrical plane by virtue of the substantial alignment of the die cutting edge and punch edge. Thus, as punch 140 moves upwardly into the die bore 36 a stepped frusto-conical cell unit is formed. As previously pointed out, and as deserving emphasis by repetition, the line contact at the circular die edge 134 is very important to avoid bending base layer 12 and warp-stressing the layers or laminae superposed thereon during the punching operation, this being particularly true of layer 14 which is quite brittle and easily fractured or cracked. The outward and downward sloping or frusto-conical shape of bottom 49 of annular groove 120 assures such line contact, as is apparent from the exaggerated showing in Fig. 12. Furthermore, the spacing of the cutting edge 134 from the sides of button 22, assuring no contact between the latter and the die, further aids in avoiding any such fracture.

Further assurance of substantial elimination of bending tendencies in the punching operation may be obtained by shaping the punch 140 to assure that initial contact with the undersurface of the base layer 12 and punching stress is concentrated substantially along the circular plane of intended severance indicated by dotted line 60 in Fig. 12. For example, the central area of the flat end face of the punch 140 may be relieved, such as by providing a shallow or dished recess, the surface of which may be substantially that of a spherical segment as shown at 62. This feature further assures punching without bending or fracturing even though the milling of the rabbet 57 may be of a coarse nature to leave a rough surface having high points and foreign matter, such as dirt or chips. This concave shape of the punch together with the line contact of the edge 134 as described above both coact to concentrate the cutting stress at the desired line to assure a clean quick cut without damage to the button 22.

This action of my improved punching operation and its importance may be more readily understood and appreciated from the exaggerated showing in Fig. 13 which is included as illustrative of an inferior punching procedure solely for graphic comparison with proper procedure of the present invention illustrated in Fig. 12. In Fig. 13 the presence of a small particle or foreign body or a high point in the rough surface of rabbet 57 is illustrated at 63, located adjacent the central area of the end of punch 40 between its unrelieved surface and the back of base layer 12. As a consequence, when punch 40 is moved toward die 132 with the milled laminated sheet stock located therebetween as shown, initial contact of the base layer will not be had in the vicinity of the circular punch edge 61; the initial stress will be applied in the vicinity of the body or high point 63, which is not opposed by any portion of the die structure on the top side of the laminated stock. As a result, there may be some tendency to warp or bend the base layer 12, at least during the initial stages of punching likely resulting in fracture of the valving layer 14 of cell button 22.

The Fig. 13 illustration also lacks the frustoconical bottom surface 49 of the annular channel 120 of Fig. 12, thus emphasizing the importance thereof in assuring initial contact and concentration of severing stress at the circular die lip 134 and in the circular plane 60. The bottom 149 of the anular groove is illustrated in Fig. 13 as being substantially flat, and with the surface 59 of die button 58 likewise being flat, as shown, it is impossible to assure that initial contact between the die 132 and the bottom 149 of the groove will be at the circular cutting lip 134, and that severing stress will be there concentrated. For example, if a high point in a surface or an intervening foreign particle, such as dirt or a chip, be located at some point remote from or radially outward of the circular lip 134, such as at 64, initial contact between the base layer 12 in the bottom surface 149 of the annular groove and the die button will be had at some point remote from the cutting lip 134, such as at 65, with stress being applied at that point and the vicinity of the point of contact at 64. As a result, pressure applied by any punch, such as 40, to the base layer 12 between such remote points of abutment contact 64 and 65 will cause such bending and development of warping stress in the punching operation as to fracture brittle valving layer 14 of cell button 22. For a procedure suitable to commercial production all precautions must be taken to eliminate tendencies of undue stress and bending which would cause fracture and cracking of the valving layer. As is now apparent from Fig. 12 and a comparison thereof with Fig. 13 such precautions are best assured by a procedure which makes certain that contact between the cutting edges of the die and punch with the base layer 12 is confined to substantial line contact along the circular plane of intended severance and that the previously machined button 22 of valving and counter-electrode layers 14 and 16 is free of contact with die structure. The Figs. 6 to 12, incl. procedure, featuring conical milling of groove 120 defining button 22, the formation of frusto-conical or sloped groove bottom surface 49, the location of cutting edges outwardly of the inner margin 52 of the groove bottom, and the concaving of the end of the punch at 62 is admirably suited to that service.

The advantages of my method of grooving and punching should now be obvious to persons skilled in the art and the improvement thereof over the prior art quite apparent. Further, it will be apparent that my method may be advantageously used in salvaging large rectifier elements which have become defective because of short circuits therethrough since it will be a comparatively easy matter to groove such elements into a plurality of smaller elements in accordance with my teaching. Each of such smaller cells may then be tested for a short circuit or in some instances they may be assembled into a rectifier bank even though one of such cells may contain a short circuit, since the error produced by a short-circuited cell forming one of a large number of cells in a bank is comparatively small and not serious in many applications.

My method of cell manufacture is also utilizable in fields other than selenium rectifiers; for example, it would be advantageous in making resistances or capacitors from sheets of laminated materials, or photoelectric cells, as will be apparent to those skilled in the art. Further, it will be apparent that my method is not limited to sheets having three laminations but may in fact, be used with sheets comprised of any number of laminations.

Accordingly, I do not seek to be limited to the precise method herein above described except as set forth in the appended claims.

I claim:

1. The method of making a plurality of rectifier cells from laminated sheet stock comprising a relatively non-brittle base metal lamina and an overlying brittle and easily fracturable valving lamina, which comprises milling through said valving lamina circular grooves having inner sloping side walls and substantially flat bottoms of appreciable width to define frusto-conical cell buttons with ribbons of the base metal exposed in the bottoms of said grooves and punching through said base metal lamina by pressure applied only within the boundaries of said exposed ribbons appreciably outward of the inner margins thereof so that the valving lamina is not shattered thereby, to form a plurality of separate cell units each having a disc of base metal superposed by a concentric frusto-conical portion in which the material of said valving lamina is offset inwardly of the edge of said base metal disc.

2. The method of making a rectifier cell from a laminated sheet comprising a relatively thick conductive relatively non-brittle base layer and a relatively thin layer of brittle and easily fracturable rectifying material thereon, which comprises milling a relatively wide circumambient grove through said rectifying layer to define an island of any desired outline surrounded by a wide substantially flat band of exposed base layer material, and punching through said base layer with die means having only line contact with said band of base layer material spaced laterally away from the edges of said island of rectifying material so that the rectifying layer is not shattered thereby.

3. The method of making rectifier cells from laminated sheet stock comprising a relatively non-brittle base metal lamina, a lamina of brittle and easily fracturable valving material thereon and a counter-electrode lamina of conductive material overlying said valving lamina; which comprises milling a circular groove down through said counter-electrode and valving laminate to form a button surrounded by a wide substantially flat band of exposed base metal contacting said band of exposed base metal with a circular edge of a female die only in a circular line of contact; and applying punching stress to the disc of base metal generally defined by the circular line of contact to sever the disc from said sheet stock without appreciably stressing said valving lamina.

4. The method of making a plurality of rectifier cells from laminated sheet stock comprising a relatively non-brittle base metal lamina, a lamina of brittle and easily fracturable valving material thereon and a counter-electrode lamina of conductive material overlying said valving lamina; which comprises milling relatively wide band-like grooves down through said counter-electrode and valving laminae to form separated islands bounded by wide bands of exposed base metal with the exposed band surfaces of base metal sloping at a few degrees down and away from the bases of said islands; inserting each island in the socket of a female die with the cutting edge of the latter having line contact with the sloping band surfaces between the boundaries thereof; and applying punching stress to said base metal lamina substantially opposite said line of contact to sever cell units from said sheet stock without appreciably stressing said valving layer.

5. The method of making a plurality of rectifier cells from relatively rigid laminated sheet stock comprising a relatively non-brittle base metal lamina of excessive thickness, a lamina of brittle and easily fracturable valving material thereon and a counter-electrode lamina of conductive material overlying said valving lamina; which comprises milling a row of circular tapered grooves along one edge of said sheet down through said counter-electrode and valving laminae to form a row of separated frusto-conical buttons bounded by circular band surfaces of base metal sloping down and away from the bases of said buttons with the excessive thickness of said base lamina giving to said sheet stock a rigidity assuring minimum stress to said valving material lamina during said groove machining; reducing the thickness of said base metal lamina only in a linear edge zone underlying said row by removal of base metal from the edge of the back face thereof; inserting each button in the socket of a female die with each circular sloping band surface having only line contact with said die at its cutting edge and with the button appreciably spaced laterally from the inner margin of the female die; and applying punching stress to said base metal lamina substantially opposite said line of contact to sever cell units from said sheet stock without unduly stressing said valving layer.

6. The method of making a plurality of rectifier cells from laminated sheet stock comprising a relatively non-brittle base metal lamina of excess thickness, a lamina of brittle and easily fracturable valving material thereon and a counter-electrode lamina of conductive material overlying said valving lamina; which comprises milling a row of relatively wide band-like grooves down through said counter-electrode and valving lamina along one edge of said sheet to form separated islands bounded by wide bands of exposed base metal with the exposed band surfaces of base metal sloping a few degrees down and away from the bases of said islands so that the thickest part of said base lamina gives said sheet stock a rigidity assuring minimum stress to said valving material lamina during said groove milling; reducing the thickness of said base metal lamina only in an edge zone underlying said row by removal of base metal from the edge of the bottom face thereof; inserting each island in the socket of a female die with the cutting edge of the latter having line contact with the sloping band surfaces and between the boundaries thereof; and applying punching stress to said base metal lamina substantially opposite said line of contact to sever cell units from said sheet stock without appreciably stressing said valving layer.

7. The method of making electrical cells from a laminated sheet having a layer of fracturable material intermediate relatively non-brittle conductive layers which comprises milling through any one of said conductive layers and said fracturable layer grooves having substantially flat bottoms of appreciable width to define an island surrounded by a wide exposed band of the other conductive layer and punching through said other conductive layer with die means having only line contact with said band and spaced away from the edge of the island.

References Cited in the file of this patent

UNITED STATES PATENTS

| | | |
|---|---|---|
| 2,296,575 | Rowley et al. | Sept. 22, 1942 |
| 2,364,733 | McCollum | Dec. 12, 1944 |
| 2,373,844 | Norsen | Apr. 7, 1945 |
| 2,392,744 | Kallmeyer | Jan. 8, 1946 |
| 2,444,473 | Skinker et al. | July 6, 1948 |

FOREIGN PATENTS

| | | |
|---|---|---|
| 529,792 | Great Britain | Nov. 28, 1940 |
| 561,529 | Great Britain | May 23, 1944 |
| 561,873 | Great Britain | June 8, 1944 |
| 633,848 | Great Britain | Dec. 30, 1949 |